(12) United States Patent
Euteneuer et al.

(10) Patent No.: US 8,228,600 B2
(45) Date of Patent: Jul. 24, 2012

(54) INVERTED MICROSCOPE FOR HIGH-CONTRAST IMAGING

(75) Inventors: Peter Euteneuer, Lahnau (DE); Ralf Krueger, Butzbach/Griedel (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 606 days.

(21) Appl. No.: 12/302,681

(22) PCT Filed: May 26, 2006

(86) PCT No.: PCT/EP2006/005024
§ 371 (c)(1),
(2), (4) Date: Nov. 26, 2008

(87) PCT Pub. No.: WO2007/137598
PCT Pub. Date: Dec. 6, 2007

(65) Prior Publication Data
US 2009/0195867 A1    Aug. 6, 2009

(51) Int. Cl.
*G02B 21/14* (2006.01)
(52) U.S. Cl. ........................ 359/370
(58) Field of Classification Search ........... 359/370–371
See application file for complete search history.

(56) References Cited

U.S. PATENT DOCUMENTS

| | | |
|---|---|---|
| 4,407,569 A | 10/1983 | Piller et al. |
| 5,128,808 A | 7/1992 | Dosaka |
| 5,708,526 A | 1/1998 | Stankewitz |
| 5,777,783 A * | 7/1998 | Endou et al. ............ 359/385 |
| 5,808,791 A | 9/1998 | Kawano et al. |
| 6,323,995 B1 * | 11/2001 | Takahama et al. ........ 359/371 |

FOREIGN PATENT DOCUMENTS

| | | |
|---|---|---|
| CH | 294755 | 11/1953 |
| DE | 8530473 | 2/1987 |
| DE | 4036065 | 5/1991 |
| DE | 4236803 | 5/1994 |
| EP | 0069263 | 1/1983 |
| GB | 707796 | 4/1954 |
| JP | 02035408 | 2/1990 |
| JP | 05341199 | 12/1993 |
| JP | 2001 194592 | 7/2001 |

OTHER PUBLICATIONS

International Search Report for International No. PCT/EP2006/005024 mailed on Feb. 21, 2007.

* cited by examiner

*Primary Examiner* — Mark Consilvio
(74) *Attorney, Agent, or Firm* — Leydig, Voit & Mayer, Ltd.

(57) ABSTRACT

An inverted microscope for the high-contrast imaging of objects includes multiple objectives configured to be disposable in an imaging beam path. Each objective has a respective objective pupil associated therewith. A lens system is also provided for generating respective intermediate images of the respective objective pupils. A modulator disposing device, which includes a plurality of modulators, is configured to dispose the modulators at predetermined respective locations on an optical axis corresponding to the locations of the respective intermediate images of the respective objective pupils so as to contrast an object image.

12 Claims, 7 Drawing Sheets

INVERTED MICROSCOPE FOR HIGH-CONTRAST IMAGING

CROSS-REFERENCE TO RELATED APPLICATION

This is a U.S. National Phase application under 35 U.S.C. §371 of International Application No. PCT/EP2006/005024, filed May 26, 2006. The International Application was published in German on Dec. 6, 2007 as WO 2007/137598 A1 under PCT Article 21 (2).

FIELD

The present invention relates to an inverted microscope for the high-contrast imaging of objects.

BACKGROUND

Inverted microscopes are characterised in that light is passed from above through the object to be examined in a transmitted light process and in that the objectives are attached below the object stage. In the case of inverted reflected light microscopes, both the illumination and the observation are carried out through the objective from below. Reflected light microscopes of this type play a central part in mineralogy and metallurgy, whereas inverted transmitted light microscopes are frequently used for the examination or for the handling of biological samples. One advantage of inverted microscopes is that the object to be examined is more accessible, as the imaging optics are for the most part arranged below the sample stage, e.g., in the stand.

Biological samples and samples of low thickness can appear almost transparent in normal microscopic examination. Objects of this type usually have differing optical thicknesses, whereas the light amplitude is not attenuated or is attenuated homogeneously via the sample. The optical path differences which exist when light passes through a sample of this type (phase object) can be rendered visible to the human eye by various contrasting processes. Of the known contrasting processes, such as phase contrast, Hoffmann modulation contrast, relief contrast, VAREL contrast or interference contrast, phase contrast and modulation contrast will be described briefly by way of example in the present document as common representatives of the contrasting processes.

In phase contrast, a ring diaphragm positioned upstream in the illumination beam path is imaged to infinity by a condenser. The illumination beams which pass through the ring diaphragm and penetrate the sample undiffracted ("zero-order diffraction arrangement") strike in the focal plane (general pupil) of the objective and a phase ring, an annular layer which is adapted by vapour deposition, in such a way that compared to the beams which penetrate the phase plate adjacent to this layer, a phase difference of $\lambda/4$ is achieved. In the case of amplitude objects, the diffracted light has with respect to the zero order a phase displacement of 180° ($\lambda/2$) and in the case of phase objects, the phase displacement is 90° ($\lambda/4$). An additional 90° of displacement in the phase ring produces a total of 180° of displacement, the same phase conditions as in the case of an amplitude object. As a result of additional attenuation of the amplitude in the phase ring, the zero-order intensity is adapted to the orders of diffraction. In the intermediate image plane of the microscope, interference of the orders of diffraction produces an image comparable to an amplitude image. Details having a refractive index higher than the surrounding environment appear darker in this image. The phase ring may be customized to the ring diaphragm in such a way that the ring diaphragm is mapped onto the phase ring. The phase ring is located in the objective pupil which is generally positioned within the objective itself. For phase contrast, use is therefore often made of special objectives in which a phase ring is integrated (for example, by vapour deposition onto a lens).

A combination of dielectric and metallic layers is generally used for constructing a phase contrast layer. The dielectric layers (for example, silicon oxide) serve to adjust the phase shift, while the metallic layers (for example, chromium) serve to adjust the desired degree of transmission.

The selection of the suitable phase ring (and thus of the associated ring diaphragm) is dependent not only on the objective, but also on the sample to be examined, which is characterised by the respective degree of transmission and the respective phase displacement. Furthermore, the size of the phase ring must be configured in accordance with the desired resolution or in accordance with the desired contrast. Special objectives having an integrated phase ring cannot respond flexibly to such differing requirements. That is to say, a flexible response would require the provision of a large number of special objectives, and this increases both complexity and costs. In practice, conventional special objectives are therefore universally usable standard solutions which in many cases cannot provide the desired result for special cases.

In modulation contrast, a pupil plane of the observation beam path contains an arranged plate having strip-like regions of differing transparency (generally 0%, 20% and 100%). In this case, the diffraction image is not acted on symmetrically to the optical axis of the objective. The phase objects which are rendered visible by a microscope of this type display a relief effect similar to that which occurs when an object is illuminated obliquely on one side. On the illumination side, at least one slotted diaphragm is linked conjugately to the modulators in the imaging beam path. The slotted diaphragm is generally mapped onto the mean transmission strip of the imaging-side modulator. Usually, these slotted diaphragms are located within a condenser disc, a specific illumination slot being provided for each magnification.

A device for selectively implementing phase contrast and relief contrast in microscopes is described in EP 0 069 263. Starting from the problem that the modulators required for phase and relief contrast are arranged in the objective pupil and therefore in the usually inaccessible interior of an objective, the aforementioned contrasting processes are generally incompatible with each other. EP 0 069 263 proposes a modulator in the objective pupil that is uniform for both contrasting processes. The transition between the contrasting processes is carried out by changing the diaphragm in the illumination beam path. The modulator in the objective pupil consists of a plate which is only partially transparent and has two concentric annular layers which influence the amplitude or phase of the light. For phase contrast observation, an annular diaphragm is introduced into the illumination beam path before the condenser. Additionally, the annular transparent region of the condenser and objective are mapped onto the phase ring of the modulator located in the objective pupil. For observation in relief contrast, a different diaphragm having a transparent annular segment-shaped region which is mapped onto the other ring is introduced into the illumination beam path, influencing only the amplitude, of the modulator in the objective pupil. The one-sided oblique angle at which the light penetrates the object plane gives rise to a relief effect which makes the object appear three-dimensional. This proposed device accordingly allows a transition between phase contrast and relief contrast without acting on the objective pupil, which is difficult to access, and without exchanging objectives made specifically for the respective contrasting process, merely by changing the diaphragms in the illumination beam path.

This aforementioned solution nevertheless requires a special objective which accommodates the aforementioned modulator consisting of a phase ring and an amplitude ring. Should the size of the phase ring be altered or a different contrasting process be used or should other objectives be utilised, the solution also displays the limited flexibility described at the outset.

A microscope for examining amplitude objects and/or phase objects is described in DE-42 36 803 C2. For this purpose, a circular sector diaphragm having a transparent circular sector, the tip of which is located in the optical axis, is attached in the illumination beam path before the condenser. This circular sector is mapped onto a phase plate, which is attached in the rear focal plane (exit pupil) of the objective, via the condenser and objective. At the location of this imaging, the phase plate has a correspondingly configured phase segment, the tip of which is also located in the optical axis, which displaces the phase of the passing light by $\lambda/4$. As a result, this contrasting process combines relief contrast and phase contrast. The flexibility of this solution is therefore also limited.

Finally, a microscope comprising a device for achieving phase contrast is described in CH-294755 which proposes generating an intermediate image of the exit pupil of the objective by means of auxiliary optics in order to introduce a phase plate at this location. Expensive special objectives containing a built-in phase plate may thus be dispensed with. The auxiliary optics proposed is in this case a magnification telescopic lens system which generates an intermediate image of the objective exit pupil (referred to hereinafter as the intermediate pupil). The phase plate is fixed at the location of the intermediate pupil. If use is made of various objectives with differing positions of the intermediate pupils, the telescopic system may be displaced along the optical axis for focusing the image of the ring diaphragm opening onto the phase plate. In the case of normal, upright microscopes, it is according to CH-294755 beneficial to arrange the aforementioned auxiliary optics and the phase plate in such a way that they are able to move individually or together. For dished (inverted) microscopes, the phase plate is to be arranged displaceably.

On account of the need, in the case of the solution of CH-294755, to have to monitor both centering and focusing by means of auxiliary optics in the event of any alteration of the position of the pupil when changing the objective, this approach is impractical.

SUMMARY OF THE INVENTION

It is an aspect of the present invention to provide, in the case of an inverted microscope of the type mentioned at the outset, various contrasting processes which do not require complex adjustment even when changing the objective. It is an additional, alternative aspect of the present invention to allow automated selection of the modulators required for a contrasting process in accordance with the selected objective.

In an embodiment, the present invention provides an inverted microscope for high-contrast imaging of objects. The inverted microscope includes multiple objectives that are configured to be disposable in an imaging beam path. Each objective has a respective objective pupil associated therewith. A lens system is also provided for generating respective intermediate images of the respective objective pupils. A modulator disposing device, which includes a plurality of modulators, is configured to dispose the modulators at predetermined respective locations on an optical axis corresponding to the locations of the respective intermediate images of the respective objective pupils so as to contrast an object image.

BRIEF DESCRIPTION OF THE DRAWINGS

The invention and its advantages will be described hereinafter in greater detail with reference to an exemplary embodiment illustrated in the following figures, in which.

DETAILED DESCRIPTION

In an embodiment, the present invention provides a device with which, for a plurality of objectives to be selected, suitable modulators can be arranged at the associated locations of the respective intermediate images of the objective pupils, referred to hereinafter as intermediate pupils. This allows rapid changeover of the modulator of a specific contrasting process as a function of the respectively used objective with the associated intermediate pupil. The modulators are arranged at the freely accessible locations of the intermediate pupils, thus obviating the need for special objectives.

The device according to the invention not only allows the modulators to be adapted to the respectively used objectives; simple changeover between various contrasting processes is also possible. For this purpose, the corresponding modulators may be exchanged at the location of the intermediate pupil. Furthermore, use may also be made of modulators customised to a specific type of sample (having specific transmission and phase displacement characteristics). Allowance may also be made for differing requirements placed on resolution and contrast, for example by using phase rings of differing size. For example, for observation using the human eye a high contrast is usually desirable, whereas high resolution is more important in the case of observation through a camera.

As a result of the use of the corresponding suitable modulators at the freely accessible location of the intermediate pupils, the invention allows flexible implementation of differing contrasting processes over the entire usable range of objectives.

In the present application, the term "modulator" refers to a phase plate, a diaphragm or any other modulator required for a corresponding contrasting process, e.g. an optical element which alters the amplitude and/or the phase of the passing light and/or spatially restricts the passing light beams.

An embodiment of the device for the arranging of modulators consists in a slide which is arranged so as to be able to move perpendicularly to the imaging beam path and in which a plurality of modulators are arranged next to one another in the sliding direction at differing heights. Displacement perpendicular to the imaging beam path causes various modulators to enter the imaging beam path. As a result of the modulators being arranged at differing heights based on the direction of the imaging beam path, the modulators each arrive at the associated location of the intermediate pupil.

In another embodiment, the device for arranging modulators has a plurality of modulators which are arranged parallel to the imaging beam path and can each be introduced into the imaging beam path. In this case, the device can, for example, be fixed on the microscope to the side of the imaging beam path. In the device, the modulators can be arranged parallel to one another and be set apart from one another at predetermined distances in such a way that a modulator is merely slid into the imaging beam path in order to arrive at the correct location of the intermediate pupil. The arrangement of the modulators in the device corresponds to the arrangement of the intermediate pupils in the imaging beam path.

Yet another embodiment of the device according to the present invention for arranging modulators comprises a revolver which is rotatable about an axis, such as is known, for example, as an arrangement of objectives. Rotating the revolver about its axis allows the modulators fastened to the revolver to be introduced into the imaging beam path.

Preferably, the lens system used for generating an intermediate image of an objective pupil is, with respect to object imaging, an afocal system. The afocal system has the advantage that the object imaging beam path which is set to infinity can be acted on (by modulators) without influencing the position and size of the object image. An afocal system consists of at least two lenses which map into infinity a beam path originating from infinity.

The proposed afocal system has, in one embodiment, a magnification factor of 1, so the imaging conditions remain unaffected. The afocal system extends the imaging beam path so as to allow the intermediate pupils (intermediate images of the objective pupils) to be positioned at an appropriate location in the tube, at which external intervention to arrange the modulators is easily possible. While the afocal system does not affect object imaging (orthoscopic beam path), it maps the objective pupils into the respective intermediate pupil planes (conoscopic beam path).

Not only does the device according to the present invention for arranging modulators allow, for a selected contrasting process, the associated modulators to be arranged rapidly and without complex adjustment at the location of the corresponding intermediate pupil when changing objectives; it is also possible to switch between various contrasting processes. For this purpose, the corresponding modulators are arranged in the imaging beam path and in the illumination beam path. For example, in the case of a fixed objective, there may be introduced at the location of its intermediate pupil one time a modulator for phase contrast, the other time a modulator for modulation contrast. For this purpose, use may be made, for example, of a slide in which the corresponding modulators are attached next to one another at the same height. In order to be able to allow for various objectives, pairs of modulators of this type (i.e. for phase contrast and modulation contrast respectively) can also be arranged next to one another at differing heights. It should be noted in this regard that when the contrasting process is changed, the corresponding modulator (diaphragm) in the illumination beam path generally has to be changed as well. Mechanical slides are generally suitable for changing the modulators in the illumination beam path. Changing contrasting processes is preferable in order to be able to select the most suitable process with regard to resolution, contrast, object fidelity and examination practice for each preparation. Furthermore, a plurality of contrasting processes can provide supplementary information about the object to be examined.

The inverted microscope according to the invention is preferably suitable for the automation of contrasting processes. Operators find such automation advantageous. For this purpose, information about the respectively selected objective (for example, by positioning the objective revolver or by transmitting transponder information of the selected objective) is transferred (for example, by the interposition of a logic unit) to the device according to the invention for the arranging of modulators in the imaging beam path. In accordance with the selected objective (and thus the position of its intermediate pupil), the corresponding modulator is automatically arranged at the location of the intermediate pupil. For a person skilled in the art, such automatic control can be carried out in the conventional manner.

It is noted that a higher level of automation can be achieved as a result of the fact that the associated modulators are automatically introduced into the imaging beam path and into the illumination beam path as a function of the selected contrasting process (and as a function of the selected objective). By transmitting the information to the selected contrasting process and to the selected objective, the appropriate modulator is arranged at the location of the intermediate pupil. At the same time, the modulator (diaphragm) appropriate for this purpose is arranged in the illumination beam path.

Even within a single contrasting process, the contrast and/or the resolution may, for example, be altered as a function of the object structures or else as a function of the observer (eye or camera) by exchanging modulators. Thus, in the case of flat object structures, good contrast is often an important factor, whereas for thick preparation structures, resolution is often an important factor. Similarly, for observation through the human eye, contrast is more important than resolution, whereas the opposite is true for observation through a camera. For an embodiment of this type, there may be attached to a location of the intermediate pupil suitable modulators (for the same contrasting process) and, if necessary, corresponding modulators in the illumination beam path. Changing the respective modulators then allows, for example, images having higher contrast or having higher resolution to be generated.

In addition to the aforementioned contrasting processes, the invention allows not only a positive, but also a negative phase contrast (displacement by $-\lambda/4$) or, for example, spectral-optimised phase or modulation contrast processes or, more generally, any desired contrasting processes to be carried out in a flexible manner using a modulator in the imaging beam path and some form of modulator in the illumination beam path. The present invention is suitable also for modulators which influence only the amplitude or the amplitude and the phase of the passing light.

Figure 1:
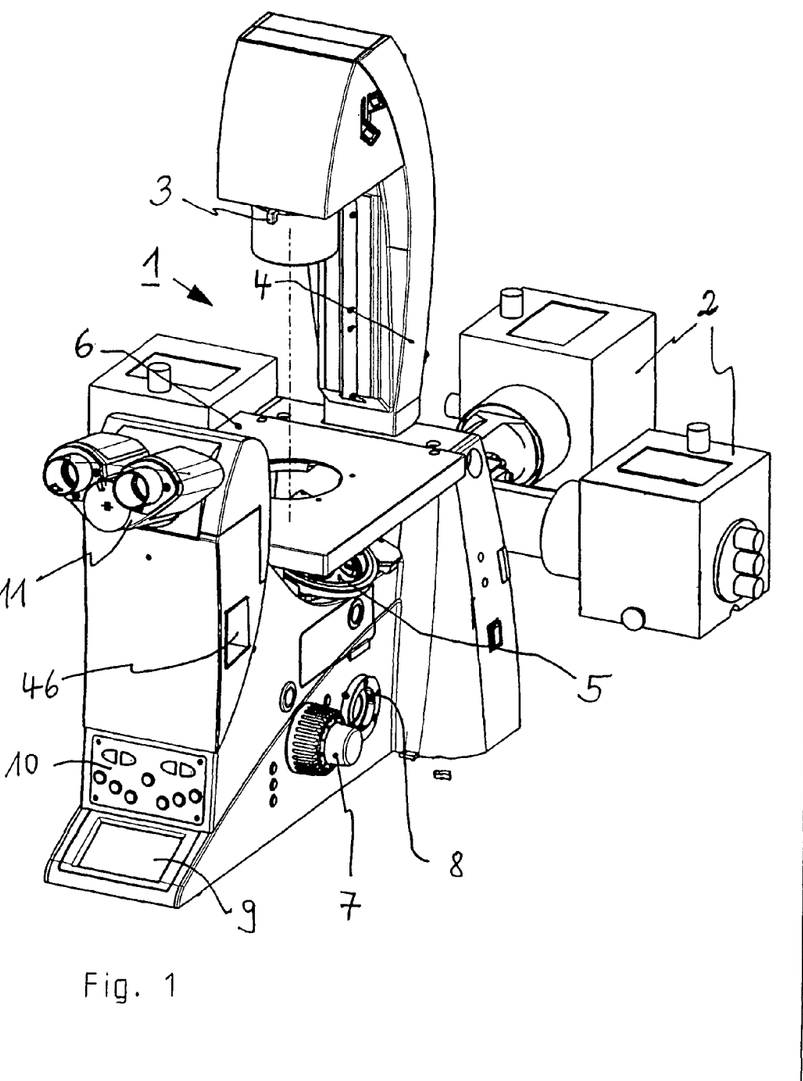
FIG. 1 is a perspective schematic view of a typical example of an inverted microscope.

FIG. 1 is a perspective view of an example of an inverted microscope 1. A transmitted light illumination arm 4, which serves to illuminate from above an object mounted on the microscope stage 6, is provided for implementing various types of illumination. For this purpose, a luminous field diaphragm 3 is arranged in the illumination beam path. Below the microscopic stage 6 is the objective revolver 5, rotation of which allows various objectives to be introduced into the beam path. Two reflected light lamp housings 2, which allow illumination with differing types of lamp, i.e. of differing spectral composition, are provided in this case for carrying out reflected light illumination. For the purposes of focusing, the objective focus can be moved in the z-direction by means of the drive 7 (z-drive). Alternatively, z-displacement of the microscope stage 6 can be carried out. Also shown is a documentation port 8 via which a portion of the imaging beam path can be uncoupled for the purposes of documentation. The tube comprising the eyepieces is denoted by reference numeral 11. Also shown is a control panel 10 with an associated display 9.

FIG. 1 shows the displacement of the imaging beam path in the lower housing portion (stand) of the inverted microscope, so in the area above the microscope stage 6 there is enough space to examine and handle the object located on the microscope stage 6. Often, the objects to be examined are located in Petri dishes. Various microscope settings, such as for example the switching-over of the type of illumination, the position of the microscope stage 6 in the three spatial directions, the selection of the objective by adjusting the objective revolver 5, the selection of the objective focus via the drive 7, may be altered, depending on the type of microscope, via the control panel 10. The associated settings can then be indicated in the display 9 which is arranged below the tube 11 so as to be readily visible to the operator.

Reference numeral 46 denotes an opening in the microscope 1 for introducing a slide 40, 50 (cf. FIGS. 4 and 5) with modulators 24 into the imaging beam path.

Figure 2:
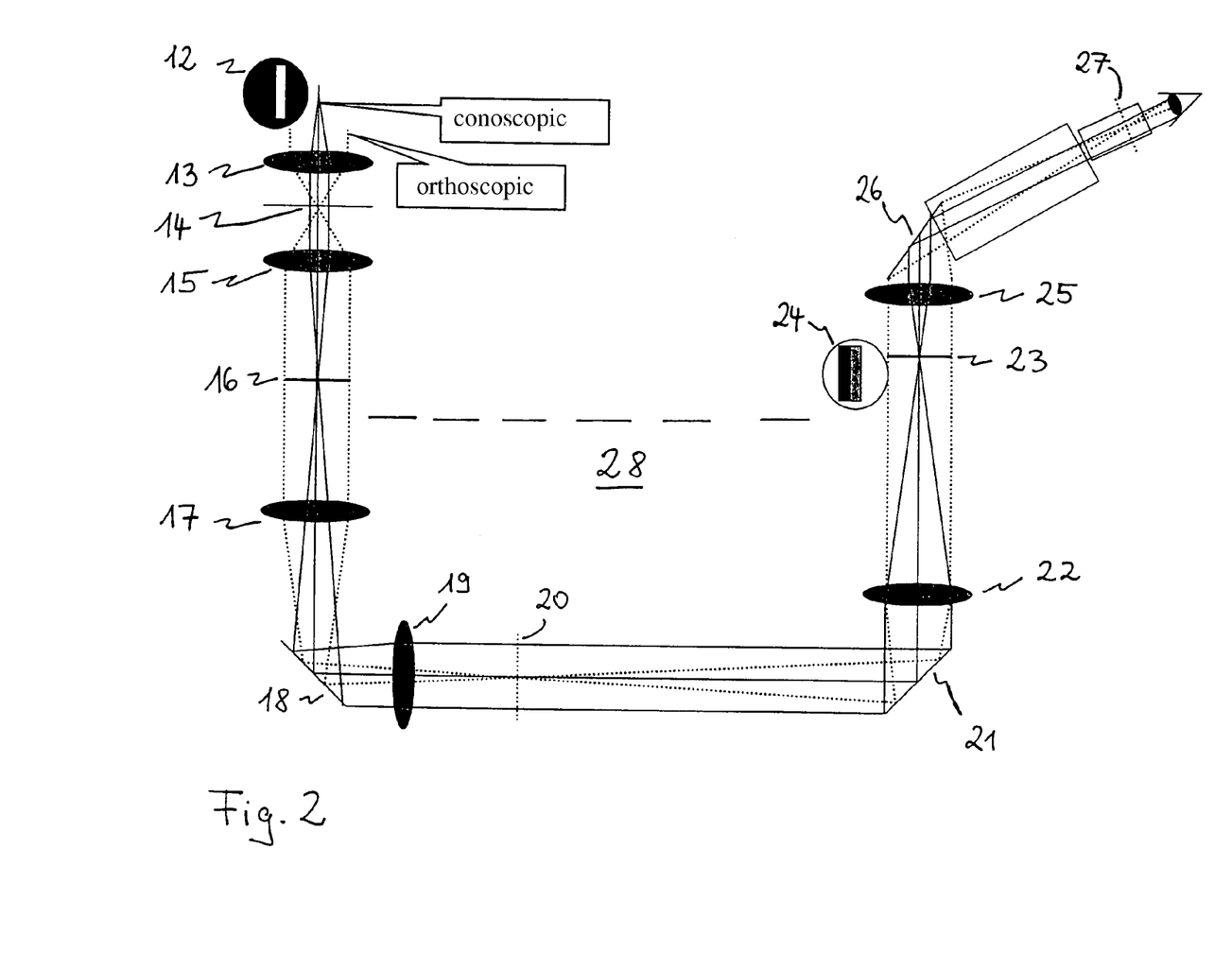
FIG. 2 is a schematic view of the conoscopic and the orthoscopic beam path in a preferred embodiment of an inverted microscope according to the invention.

FIG. 2 is a schematic view of the orthoscopic and conoscopic beam path in an embodiment of an inverted microscope 1 according to the present invention. The conoscopic beam path representing the imaging of the objective pupil is shown as a solid line and the orthoscopic beam path representing the object imaging is shown as a broken line.

In FIG. 2, the modulator in the illumination beam path is denoted by reference numeral 12. For the modulation contrast process carried out in this case, the modulator 12 is a diaphragm in the form of an illumination slot arranged in the condenser pupil. The condenser is denoted by reference numeral 13. The object 14 is illuminated in the object plane via this condenser 13. For illuminating the object 14, Köhler-type illumination is generally selected, although critical-type illumination can also be used. The objective 15 maps the object 14 into infinity (orthoscopic beam path); a tube lens (in this case, the second tube lens 25) generates an intermediate image (in this case, the second intermediate image 27) which can be observed through one or two eyepieces (shown only schematically in the present document).

According to the embodiment illustrated in FIG. 2, an afocal system 28 having a magnification factor of 1 is positioned between the objective 15 and the (second) tube lens 25. The afocal system 28 does not affect the position and size of the object image. The afocal system 28 maps back into infinity beams originating from infinity (cf. the orthoscopic beam path in FIG. 2). In the present case, the afocal system 28 has a (first) tube lens 17, a field lens 19 and an achromat 22. The first tube lens 17 and the field lens 19 generate a first intermediate image 20 of the object 14 that is, for its part, mapped back into infinity by the achromat 22. Two deflection mirrors 18 and 21 are provided for producing a "U-shaped" beam path. It should be noted that the U-shaped beam path can also be replaced by a V-shaped beam path, in which case the beam path then extends from the object 14 directly to the first deflection mirror 18 and from there directly to the second intermediate image 27.

The conoscopic beam path (solid line) will now be examined in greater detail. The objective pupil 16 is associated with the objective 15 (in the imaging of parallel beams, the position of the objective pupil corresponds to that of the objective focal plane). In the currently conventional construction of an objective 15, which is illustrated only schematically in FIG. 2, the objective pupil 16 is usually located in the interior of the objective that can be accessed only with difficulty. The afocal system 28 maps the objective pupils 16 into an intermediate image of the objective pupil, referred to hereinafter as the intermediate pupil 23. According to the invention, a suitable modulator 24, in this case a modulator which is suitable for carrying out a modulation contrast process and consists of three strips of differing transmissivity (for example, 0%, 20% and 100%) arranged parallel to one another, is arranged at the location of the intermediate pupil 23. The modulator 24 is fixed in the intermediate pupil 23. A displaceable arrangement is not necessary, as the intermediate image of the objective pupil 16 is, in the illustrated construction, generated at the fixed location of the intermediate pupil 23. The afocal system 28 is also fixed. Depending on the selected objective 15, the afocal system maps the respective objective pupil 16 into a corresponding intermediate pupil 23. As a result of the fixed arrangement of the modulators 24 and the fixed arrangement of the afocal system 28, adjustment and focusing problems are eliminated in the inverted microscope 1 according to the invention.

FIG. 2 shows the conditions in the carrying-out of a specific contrasting process (modulation contrast) using a specific selected objective 15 in a microscope 1 according to the invention. This clearly reveals that, in the case of the fixedly selected objective 15, the contrasting process can easily be changed by changing the corresponding modulators 12 and 24. Simple transition to a phase contrast process is thus, for example, possible by introducing a ring diaphragm into the illumination beam path as the modulator 12 and by introducing a correspondingly configured phase plate as the modulator 24 in the intermediate pupil 23. Such transition may easily be carried out manually or automatically using correspondingly configured slides. Depending on the selected contrasting process, a phase object 14 is—as mentioned hereinbefore in the introductory part of the description—imaged in the form of an amplitude image (phase contrast) or in the form of a relief image (modulation contrast). For this purpose, the second tube lens 25 generates a second intermediate image 27 of the object that can be recorded by a camera or observed directly by an observer (e.g., via an eyepiece). A further deflection mirror 26 may be provided for deflecting into the inclined tube portion.

Figure 3:
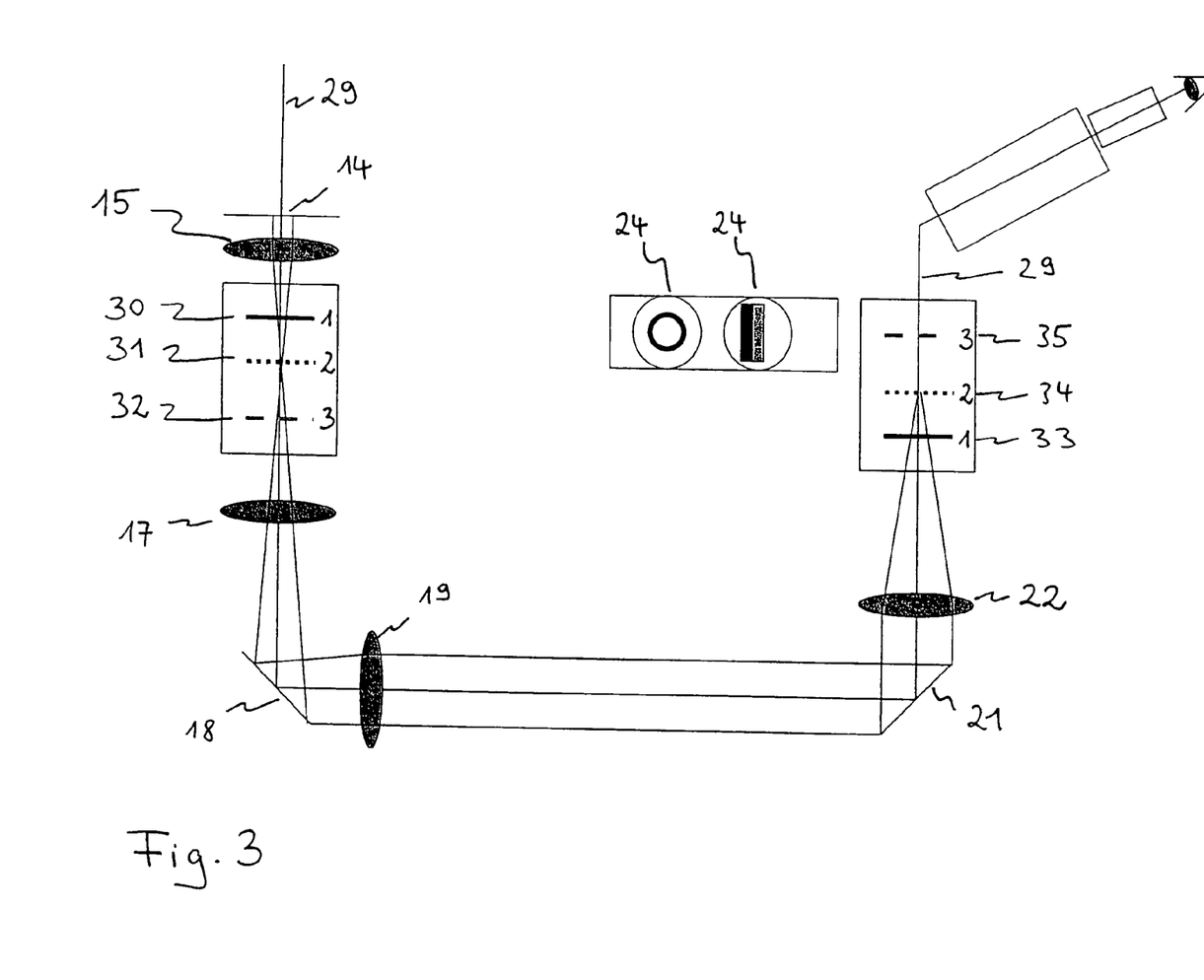
FIG. 3 shows a detail of the conoscopic beam path in an inverted microscope according to FIG. 2, showing various positions of objective pupils and corresponding positions of the intermediate pupils.

FIG. 3 illustrates the conditions such as are found in the conventional use of a plurality of the objectives 15. FIG. 3 is a more schematic version of a detail from FIG. 2, FIG. 3 showing merely the conoscopic beam path. The focus in FIG. 3 is on the differing positions of the objective pupils. These pupil positions 30, 31 and 32 are defined, depending on the objective 15 used, at discrete locations. For example, typical objectives of the Applicant's have the following pupil positions, defined as the respective distance between the object and the objective pupil: A: 47.5 mm, B: 40 mm, C: 35 mm, D: 27.5 mm and E: 20 mm. It will be noted in this connection that an appropriate objective design allows differing objectives to be assigned to the same class (A, B, C, D or E) of pupil positions. Three representatives of these pupil positions are denoted in FIG. 3 by reference numerals 30, 31 and 32. The optics illustrated in FIG. 3 and discussed in detail with reference to FIG. 2 maps the objective pupils 30, 31, 32, illustrated in FIG. 3 based on the pupil position 2 (reference numeral 31), at a magnification factor of 1 into the intermediate pupils 33, 34, 35, cf. the intermediate pupil 2 denoted by reference numeral 34 in FIG. 3. Under the selected imaging conditions, the distance between the pupil positions 1, 2 and 3 corresponds to that between the intermediate pupils 1, 2 and 3, thus producing, if for example the aforementioned objectives of the Applicant's are used, a maximum difference of the pupil positions or intermediate pupil positions of 27.5 mm.

According to the invention, in the case of the objective 15 used in FIG. 3, the modulator 24 required for the respective contrasting process is then to be brought to the location of the intermediate pupil 2 that is denoted by reference numeral 34. If the objective 15 were exchanged for a correspondingly varying objective pupil (for example, pupil position 3, reference numeral 32), the corresponding modulator 24 would be arranged at the location of the corresponding intermediate pupil (intermediate pupil 3, reference numeral 35).

Preferably, if both the objective and the pupil are changed, the corresponding modulator 24 will automatically be introduced at the associated location of the intermediate pupil 33, 34 or 35. Possible devices for introducing the modulator 24 at the location of the intermediate pupils 33, 34, 35 will be described hereinafter. If a device of this type is configured appropriately, contrasting processes may also be changed, for example from phase contrast to modulation contrast and vice versa. For this purpose, the corresponding modulators 24 can be arranged next to one another (cf. FIG. 3).

Figure 4:
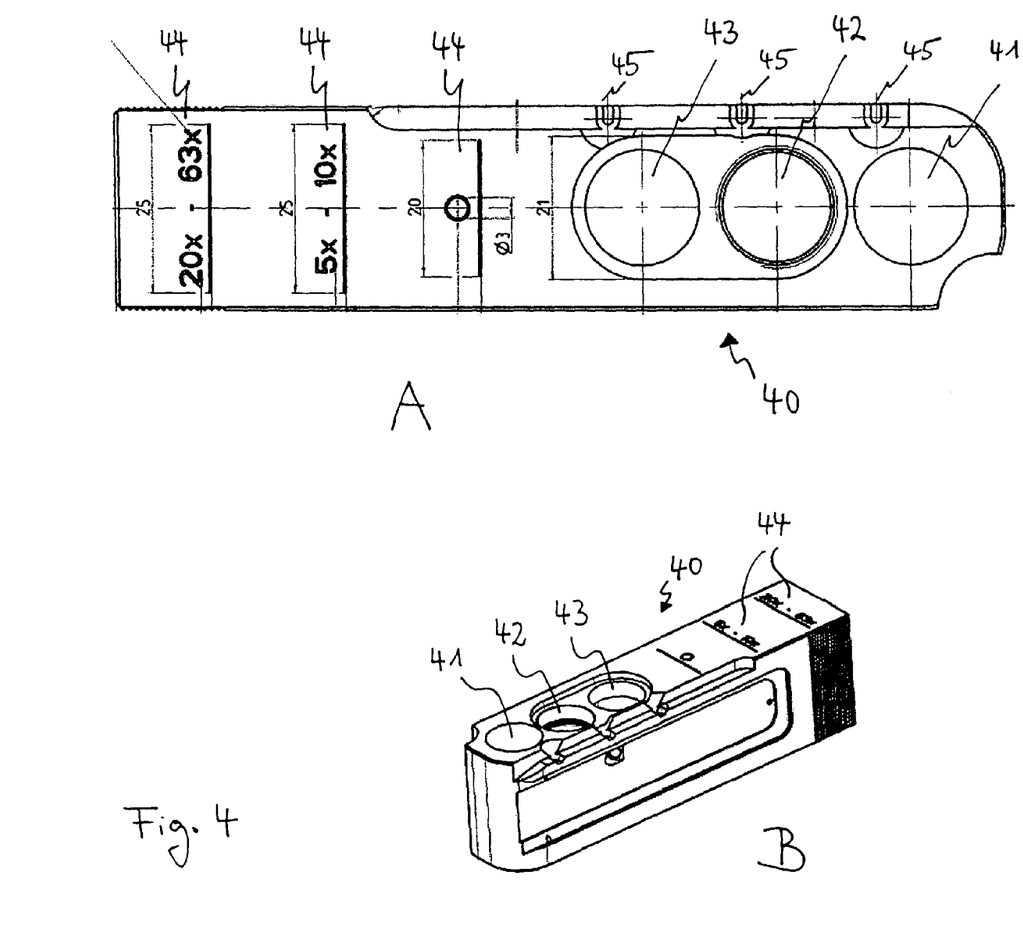
FIG. 4 shows a slide for modulators in the imaging beam path in a plan view (FIG. 4A) and in a perspective view (FIG. 4B)

FIG. 4 shows a slide 40 for phase contrasting processes. FIG. 4B is a perspective view of the slide 40. In this the exemplary embodiment, the first opening 41 does not carry a modulator for phase contrast; it is therefore freely passable. The second opening, denoted by reference numeral 42, contains a modulator for phase contrast, i.e. a phase plate such as was discussed in detail in the introductory part of the description. The third opening, denoted by reference numeral 43, in the slide 40 also contains a phase plate of this type. The phase plates in the opening 42 and 43 are arranged at differing locations in the direction of the axis of the respective opening 42, 43. In the case of an inverted microscope 1 according to the invention, the slide 40 may be displaced in the longitudinal direction of the slide 40 in such a way that in each case one of the openings 41, 42 or 43 is positioned in the imaging beam path. For this purpose, an appropriate opening 46 (cf. FIG. 1) is provided in an inverted microscope 1 according to the invention for inserting the slide 40. The positions of the phase plates in the openings 42 and 43 in the slide 40 are selected in such a way that on insertion of the slide 40 into the imaging beam path of the inverted microscope 1, the phase plates are each arranged at differing intermediate pupil positions.

FIG. 4A is a plan view from above of the slide 40. The slide 40 can be locked in three differing positions on an inverted microscope by means of three latching grooves 45. The respective position is illustrated by the captions 44. In the position denoted by "0", the opening 41 in the slide 40 is located in the imaging beam path, so the beam path is not influenced in this position. In the position denoted by "5×-10×" for the corresponding objectives, the opening 42 with the corresponding phase plate is located in the imaging beam path. These are exemplary objectives to which pupil class A is assigned in the Applicant's objective programme. In the position denoted by "20×-63×" for the corresponding objectives, the opening 43 with the corresponding phase plate is located in the imaging beam path. These are exemplary objectives to which pupil class C is assigned in the Applicant's objective programme. If the opening 42 is located in the imaging beam path, the corresponding phase plate is positioned at the location of the intermediate pupil of a selected objective. If another objective of the other pupil class is selected, the opening 43 is accordingly brought into the imaging beam path in order to position the phase plate contained therein at the correct location of the intermediate pupil of this objective.

The slide 40 illustrated in FIG. 4 is merely an example which can be used in practice of a device for the arranging of phase contrast modulators in the intermediate pupil locations of objectives. It is possible to enlarge the slide in the longitudinal direction by forming further openings with phase plates, an opening of this type being associated with each pupil class. It is also conceivable to use, instead of a slide of this type, a plurality of small slides which may have to be exchanged when changing objectives.

Figure 5:
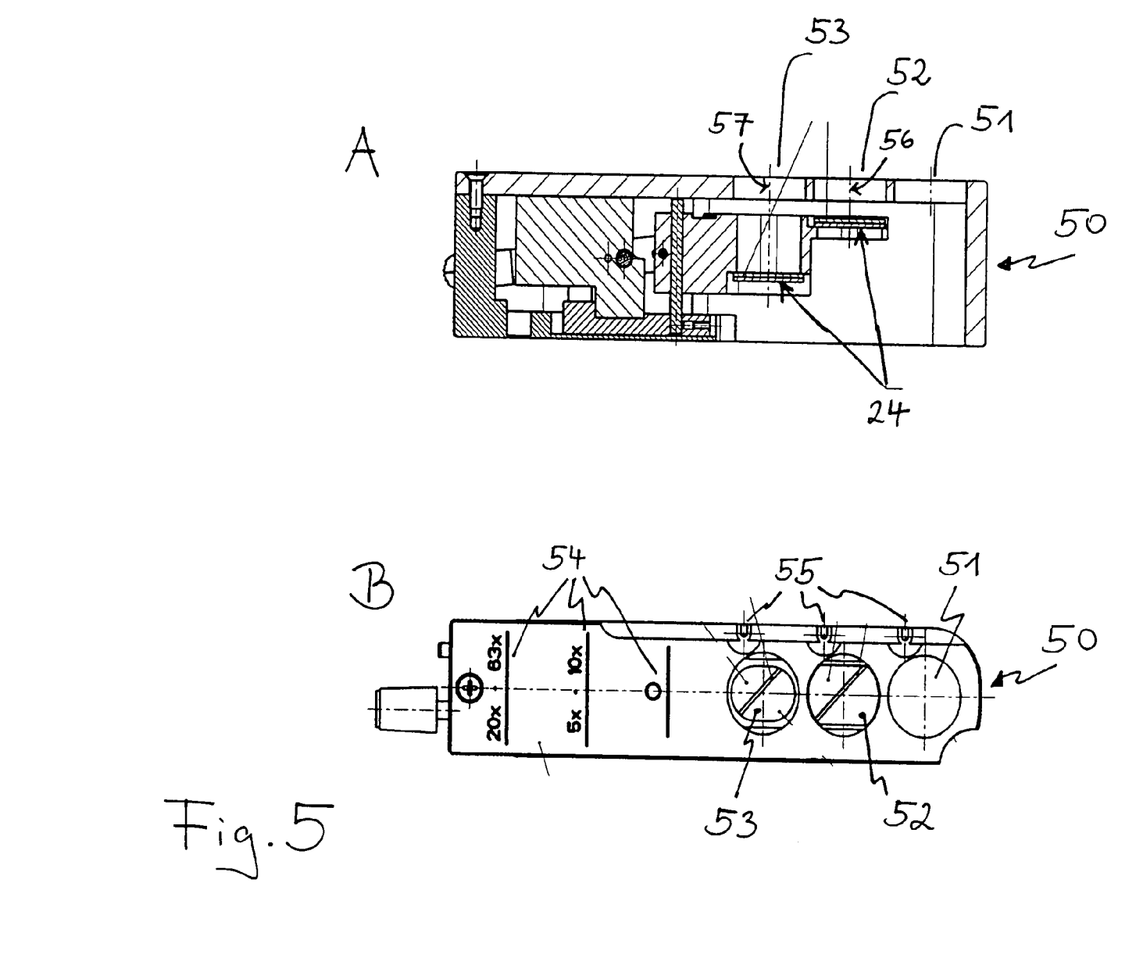
FIG. 5 shows a similar slide, in this case for modulators of a modulation contrast process, for arranging in the imaging beam path in longitudinal section (FIG. 5A) and in a view from above (FIG. 5B)

FIG. 5 shows a slide 50 for modulation contrast processes. In order to carry out a modulation contrast process, this slide is inserted, instead of the slide 40, into the opening 46 in an inverted microscope 1 according to the invention (cf. FIG. 1). Like the slide 40 from FIG. 4, the slide 50 has three openings 51, 52 and 53, the first opening 51 being a freely passable opening, whereas the openings 52 and 53 have corresponding modulators 24.

As shown in FIG. 5A, in longitudinal section through the slide 50, the modulators 24 of the respective openings 52 and 53 are located at differing heights (height in relation to the position along the axes 56 and 57 through the openings 52 and 53), these positions corresponding, in turn, to the positions of the intermediate pupils in the imaging beam path.

FIG. 5B is a plan view from above of the slide 50 corresponding substantially to the view according to FIG. 4A. Reference is therefore made to the corresponding discussion in relation to FIG. 4. The plan view according to FIG. 5B shows the modulators 24 for the modulation contrast.

That which was said hereinbefore in relation to the slide 40 from FIG. 4 applies to the possible embodiments of a slide 50 for modulation contrast (increase in the number of openings or distributing the openings over a plurality of slides).

Figure 6:
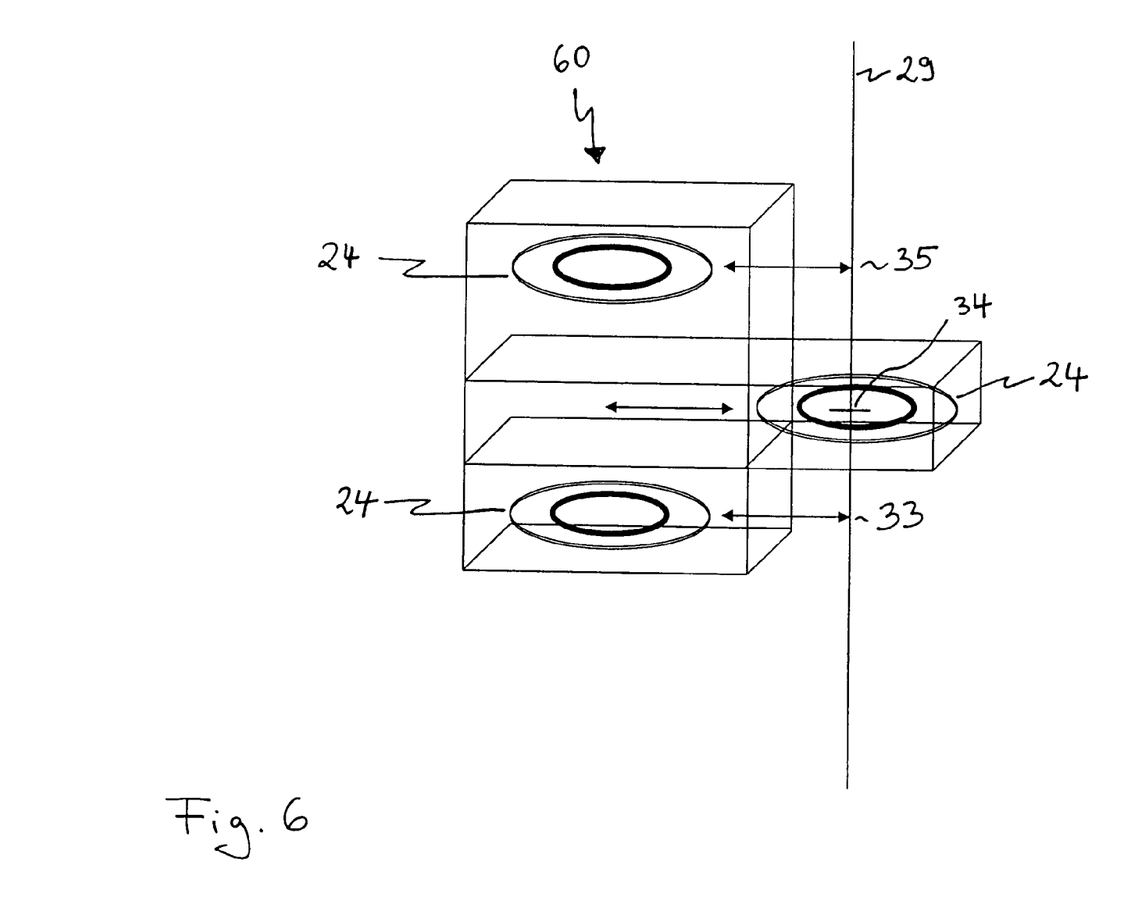
FIG. 6 shows schematically a device for the arranging of modulators arranged parallel to the imaging beam path.

FIG. 6 is a highly schematic view of a device 60 for the arranging of modulators 24, in which the modulators 24 are arranged parallel to the imaging beam path and can each be individually introduced into the imaging beam path. The double-headed arrow in FIG. 6 indicates the possibility of moving the centre of the individual modules 24 toward the optical axis 29. As in FIG. 3, reference numerals 33, 34 and 35 denote the locations of the intermediate pupils. The modulators 24 shown in FIG. 6 are phase contrast modulators, a phase contrast modulator 24 for objectives having an associated intermediate pupil 34 being introduced in this example into the imaging beam path. The device 60 could be referred to as a drawer. The modulators 24 can be mounted in mounts which can be slid into the imaging beam path.

Figure 7:
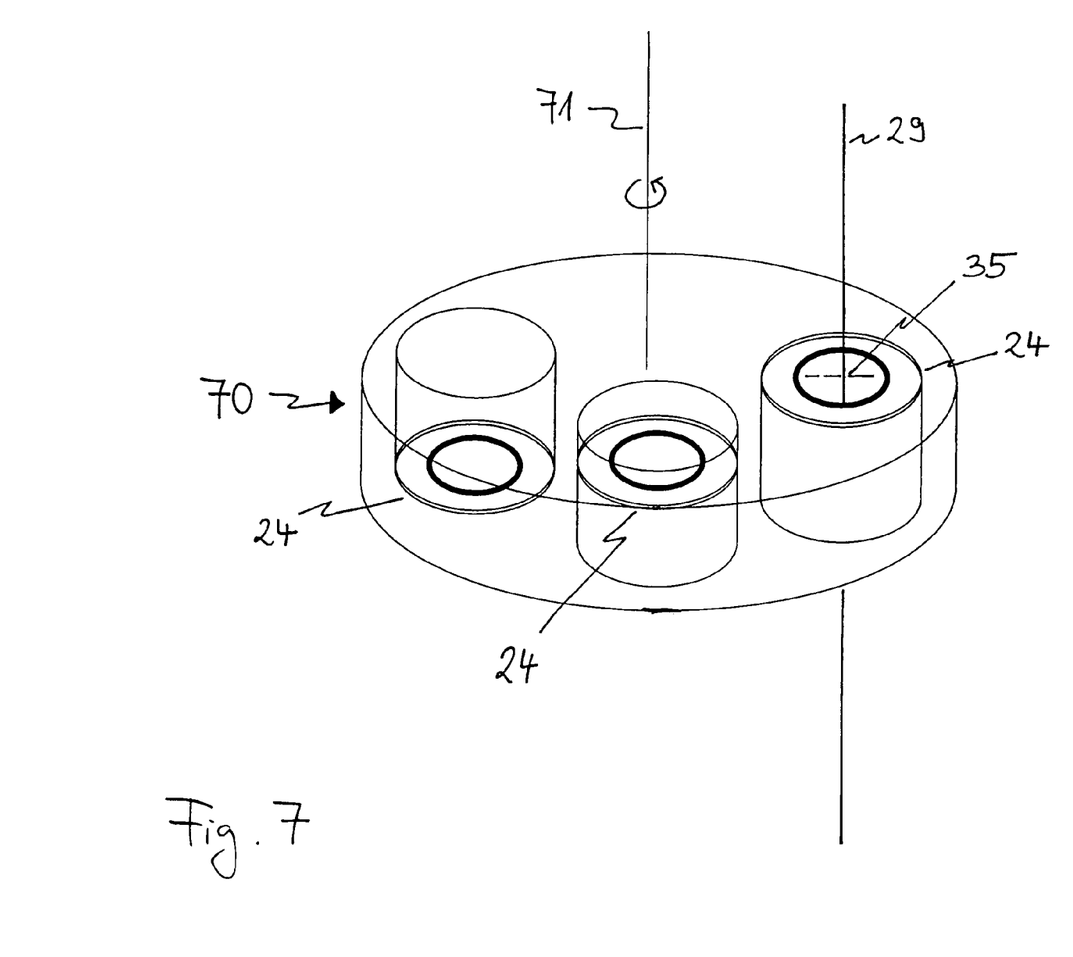
FIG. 7 shows schematically, again, a device for the arranging of modulators, which is configured as a revolver.

FIG. 7 is a schematic view of a further possible embodiment of a device for the arranging of modulators. This device is a revolver 70 with modulators 24 attached therein. FIG. 7 shows that the modulators are arranged at differing heights corresponding to the positions of the intermediate pupils 33, 34, 35. Rotating the revolver 70 about the axis 71 accordingly allows various modulators 24 to be swiveled into the intermediate pupils 33, 34, 35. The modulators 24 in FIG. 7 are, again, phase contrast modulators. In the illustrated example of FIG. 7, a phase contrast modulator 24 is swiveled into the intermediate pupil 35.

The invention claimed is:

1. An inverted microscope for high-contrast imaging of objects, comprising:
    a plurality of objectives disposable in an imaging beam path, each objective having a respective objective pupil associated therewith;
    a lens system for generating respective intermediate images of the respective objective pupils; and a modulator disposing device including a plurality of modulators having respective fixed positions with respect to a direction of an optical axis, and being configured to dispose the modulators at predetermined respective locations on the optical axis corresponding to locations of the respective intermediate images of the respective objective pupils so as to contrast an object image.

2. The inverted microscope according to claim 1, wherein the modulator disposing device includes a slide adapted to move along a longitudinal axis which is perpendicular to the imaging beam path, the slide including the plurality of modulators in a spaced relationship along the longitudinal axis and disposed at differing heights corresponding to differing locations of the respective intermediate images.

3. The inverted microscope according to claim 1, wherein the plurality of modulators are disposed within the modulator disposing device in series parallel to the imaging beam path and at respective heights corresponding to locations of the respective intermediate images.

4. The inverted microscope according to claim 1, wherein the modulator disposing device includes a revolver which is rotatable about an axis, the plurality of modulators being disposable in the optical axis by rotation of the revolver and arranged in the revolver at respective positions corresponding to locations of the respective intermediate images.

5. The inverted microscope according to claim 1, wherein the lens system includes an afocal lens system.

6. The inverted microscope according to claim 1, wherein the afocal lens system is fixed in the direction of the optical axis.

7. The inverted microscope according claim 5, wherein the afocal lens system has a magnification factor of one.

8. The inverted microscope according to claim 1, further comprising an additional modulator disposed in an illumination beam path of the inverted microscope and corresponding to at least one of the plurality of modulators of the modulator disposing device so as to provide for multiple contrasting processes.

9. The inverted microscope according to claim 8, wherein the additional modulator is configured to be disposed in an illumination beam path of the inverted microscope as a function of a selected contrasting process.

10. The inverted microscope according to claim 1, wherein the modulator disposing device is configured to automatically introduce a first of the modulators into the imaging beam path as a function of a selected first of the objectives.

11. The inverted microscope according to claim 1, wherein the plurality of objectives have a fixed number of pupil positions.

12. The inverted microscope according to claim 1, wherein at least two of the plurality of objectives have a same pupil position.

* * * * *